V. C. BRYANT.
BEAN HARVESTER.
APPLICATION FILED JULY 12, 1911.

1,038,720.

Patented Sept. 17, 1912.

Witnesses
H. A. Stock.
F. P. Schroeder.

Inventor
Virgil C. Bryant

By Harry C. Schroeder
Attorney

UNITED STATES PATENT OFFICE.

VIRGIL C. BRYANT, OF BERKELEY, CALIFORNIA.

BEAN-HARVESTER.

1,038,720.

Specification of Letters Patent. Patented Sept. 17, 1912.

Application filed July 12, 1911. Serial No. 638,164.

*To all whom it may concern:*

Be it known that I, VIRGIL C. BRYANT, a citizen of the United States, residing at Berkeley, in the county of Alameda and State of California, have invented certain new and useful Improvements in Bean-Harvesters, of which the following is a specification.

This invention relates to bean harvesters, and has for its object the production of a harvester for cutting the vines close to the ground and also for cutting vines which may grow across from row to row.

Another object of this invention is the production of a harvester which is simple in construction, efficient in operation, and consists of a comparatively small number of parts.

With these and other objects in view, this invention consists of certain novel constructions, combinations, and arrangements of parts, as will be hereinafter more fully described and claimed.

Figure 1:
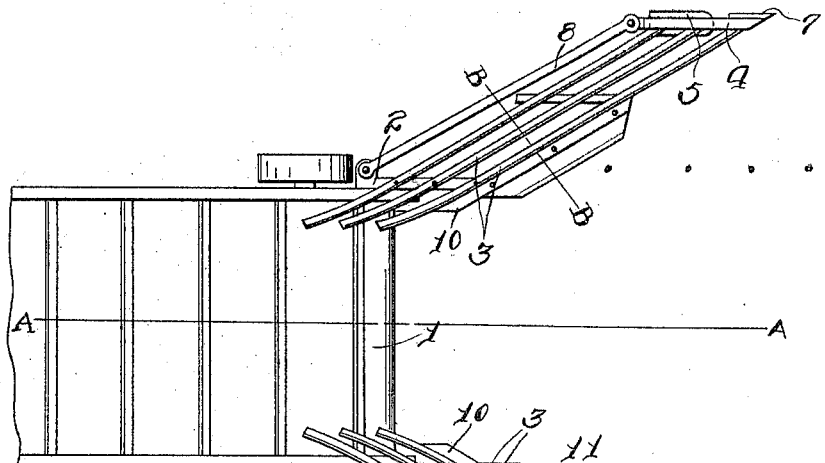
Figure 2:
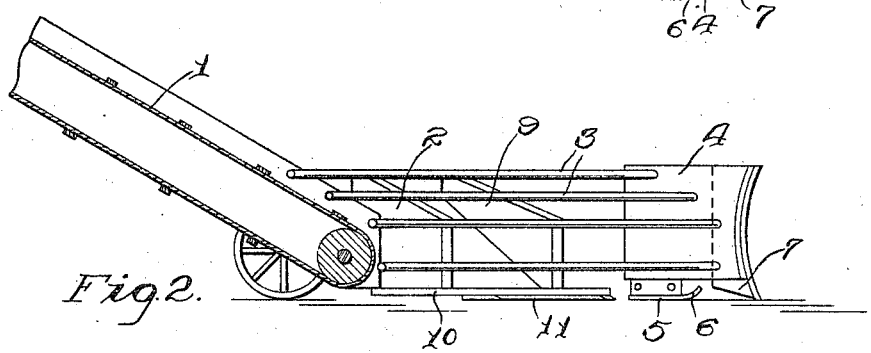
Figure 3:
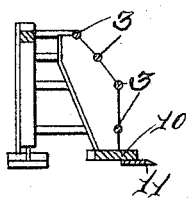

In the drawings: Figure 1 is a top plan view of the harvester attachment associated with a conveyer. Fig. 2 is a section taken on line A—A of Fig. 1. Fig. 3 is a section taken on line B—B of Fig. 1.

Referring to the drawings by numerals 1 designates a conveyer to which is connected a pair of supporting cleats 2. Each of these supporting cleats carries a frame comprising a plurality of longitudinally extending rods 3, which rods are secured at their outer ends to a cutter supporting plate 4 and at their rear ends to the supporting cleat 2. A runner 5 is carried by the lower end of the supporting plate 4 and allows the frame to be easily glided over the surface of the ground owing to its upturned end 6. A curved cutting knife 7 is carried by the forward end of the supporting plate 4 and is adapted to cut any of the vines which may extend transversely of the rows of beans. A longitudinally extending brace 8 is connected to the upper end of the cleat 2 and the upper end of the plate 4 for strengthening the last mentioned plate and holding the same in a vertical position.

A bracing cleat 9 engages the longitudinally extending rods 3 intermediate their ends and a mower knife supporting bar 10 is carried by the lower ends of the cleat 2 and the bracing cleat 9. A cutter blade 11 is carried by each of the supporting bars 10 and is adapted to cut the vertical vines off close to the ground.

The frames above referred to diverge from the front end of the conveyer as shown in Fig. 1, so as to direct the vines on to the conveyer after the vines have been cut. The machine is preferably placed so as to have the mower blades come in contact with the rows of vines and have the cutting knife 7 operate on either side of said rows for cutting the vines growing transversely of the rows.

From the above description it will be obvious that as the machine moves forward, the vines will be cut and by falling upon the bars 3 will be directed to the conveyer 1 and carried to any convenient receptacle, thus doing away with the necessity of first cutting the vines and then gathering the same by hand preparatory to loading.

What I claim is:—

A bean harvester of the class described comprising a plurality of frames, each frame comprising a vertical cutter supporting plate, and a plurality of rearwardly extending bars, a supporting cleat engaging the rear ends of said bars, a bracing rod extending from the top of said supporting cleat to the top of said supporting plate for bracing the outer end of said frame, an auxiliary bracing cleat engaging said bars intermediate their ends, a horizontal cutting blade supported by said supporting cleats and extending for a portion of the length of said rods, a vertically extending cutter carried by said supporting plate, and a shoe carried by said supporting plate for facilitating the moving of said frame upon the ground and preventing the lower end of said cutter blade from digging into the ground.

In testimony whereof I affix my signature in presence of two witnesses.

VIRGIL C. BRYANT.

Witnesses:
E. G. GRAY,
F. P. SCHROEDER.